Dec. 20, 1966     R. L. JACKLIN ETAL     3,292,451

SHIFT MECHANISM FOR CHANGE-SPEED TRANSMISSION

Filed March 24, 1965     5 Sheets-Sheet 1

INVENTORS
G. L. MARQUART
R. L. JACKLIN

Dec. 20, 1966  R. L. JACKLIN ETAL  3,292,451
SHIFT MECHANISM FOR CHANGE-SPEED TRANSMISSION
Filed March 24, 1965  5 Sheets-Sheet 3

INVENTORS
G. L. MARQUART
R. L. JACKLIN

Dec. 20, 1966    R. L. JACKLIN ET AL    3,292,451
SHIFT MECHANISM FOR CHANGE-SPEED TRANSMISSION
Filed March 24, 1965    5 Sheets-Sheet 4

INVENTORS
G. L. MARQUART
R. L. JACKLIN

Dec. 20, 1966  R. L. JACKLIN ET AL  3,292,451
SHIFT MECHANISM FOR CHANGE-SPEED TRANSMISSION
Filed March 24, 1965  5 Sheets-Sheet 5

INVENTORS
G. L. MARQUART
R. L. JACKLIN

United States Patent Office

3,292,451
Patented Dec. 20, 1966

1

3,292,451
SHIFT MECHANISM FOR CHANGE-SPEED
TRANSMISSION
Roger L. Jacklin, Waterloo, and Gordon L. Marquart, Jesup, Iowa, assignors to Deere & Company, Moline, Ill., a corporation of Delaware
Filed Mar. 24, 1965, Ser. No. 442,305
13 Claims. (Cl. 74—477)

This invention relates to change-speed transmissions for vehicles and the like and more particularly to improved shift mechanism therefor.

The embodiment of the invention chosen here for purposes of description and illustration is designed especially for a tractor and is therefore typical of heavy-duty use in which various problems arise in connection with shiftability, retention of the transmission in a selected speed and selection of suitable shift patterns. These problems are somewhat more complicated in a dual-range multi-speed transmission because of the use of two shift actuators or levers. One of the problems encountered in heavy-duty transmissions is the tendency of the transmission to jump out of gear. This can be countered by many design expedients, but many of these interfere with shifting ease and efficiency. According to the present invention, a novel form of interlock is utilized which does not materially increase the shift effort required by the operator.

Still another problem is the tendency of the shifted element to coast linearly past neutral when it is returned from a shifted position. When this occurs, the transmission becomes locked up and a certain amount of disassembly is required to relieve the condition. According to the present invention, means is provided for preventing the over-run of the shifted element when being returned to its neutral position.

In some instances, particularly in the employment of dual-range multi-speed transmissions, the highest speed produced by the transmission is too high and exceeds legal requirements in certain areas. Nevertheless, in areas where higher speeds are permitted, such speed is desirable for convenience and efficiency in transport or hard-road conditions. The present invention includes provision for locking out the highest speed in the transmissions designated for use in restricted areas, while at the same time leaving the transmission readily convertible for full use in other areas.

It is therefore a principal object of the present invention to provide an improved shifter or control for a change-speed transmission, particularly a transmission of the heavy-duty dual-range multi-speed type. A significant object resides in improved means for preventing the transmission from jumping out of gear. A further significant object resides in means for preventing over-run of a shifted element when being returned to its neutral position. A still further object is the provision of interlock means for locking out, when desired, one of the speeds of the transmission. A still further object is the provision of additional shifter lock means responsive to the position of a movable control element other than the shift actuator; e.g., the vehicle clutch pedal. A still further object is to provide these improvements in a transmission of novel and inexpensive design, embodying features of low initial cost, ease of maintenance and long life.

The foregoing and other important objects inherent in and encompassed by the invention will become apparent

2 as a preferred embodiment thereof as disclosed, by way of example, in the ensuing description and accompanying sheets of drawings, the figures of which are described below.

Figures 14, 15, 16:
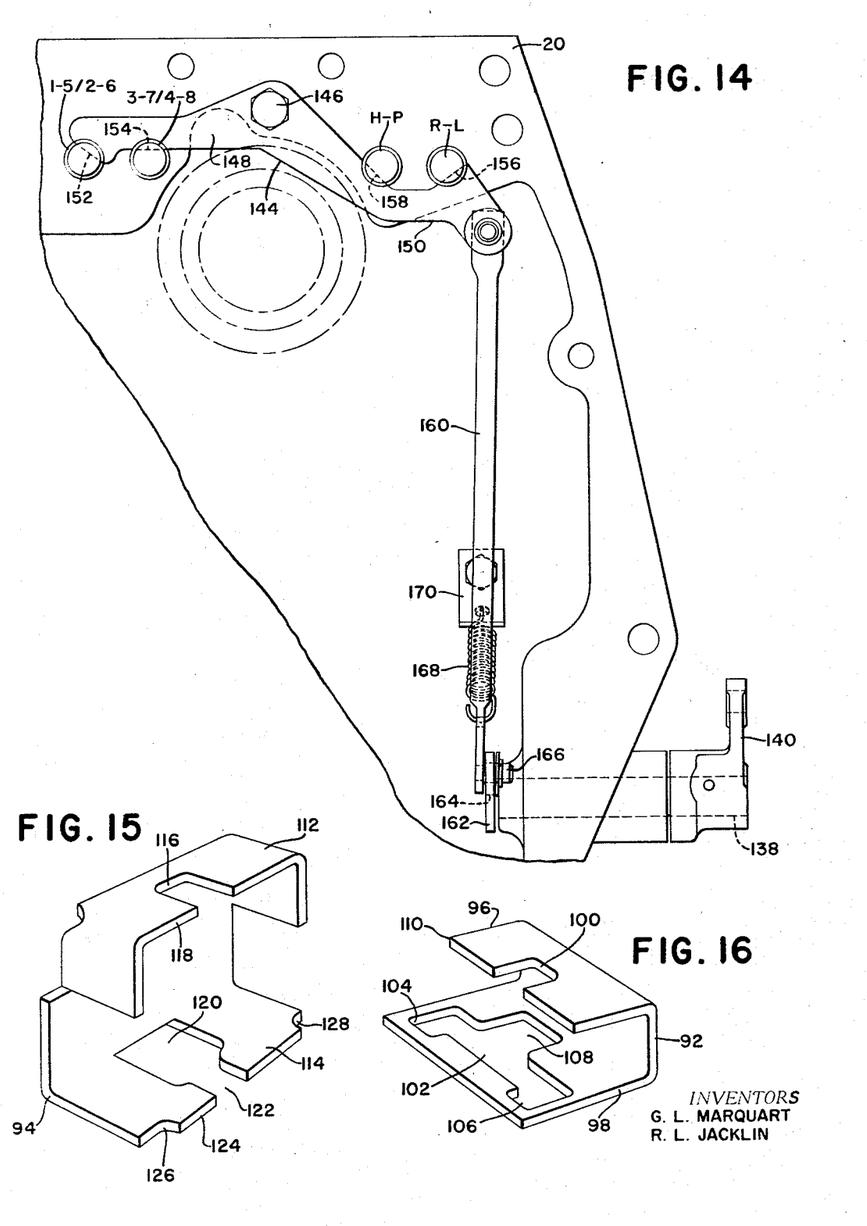
FIG. 14 is a view as seen generally along the line 14—14 of FIG. 4.
FIG. 15 is an enlarged perspective of the high-park shift guide.
FIG. 16 is an enlarged perspective of the reverse-low shift guide.

For orientation purposes, the description will proceed on the basis of the installation of the shift mechanism in a tractor in which the basic elongated components are fore and aft. Thus, the front of the tractor will be to the right as seen in FIGS. 1, 2, 4 and 9. FIGS. 3 and 14 are seen from the front of the tractor and therefore the left side of the tractor is at the viewer's right. It will be understood, of course, that this treatment of the disclosure is for purposes of clarity and not by way of limitation.

Certain parts of the structure will be designated by name on the drawings without the use of reference characters.

Figures 9, 10, 11, 12, 13:
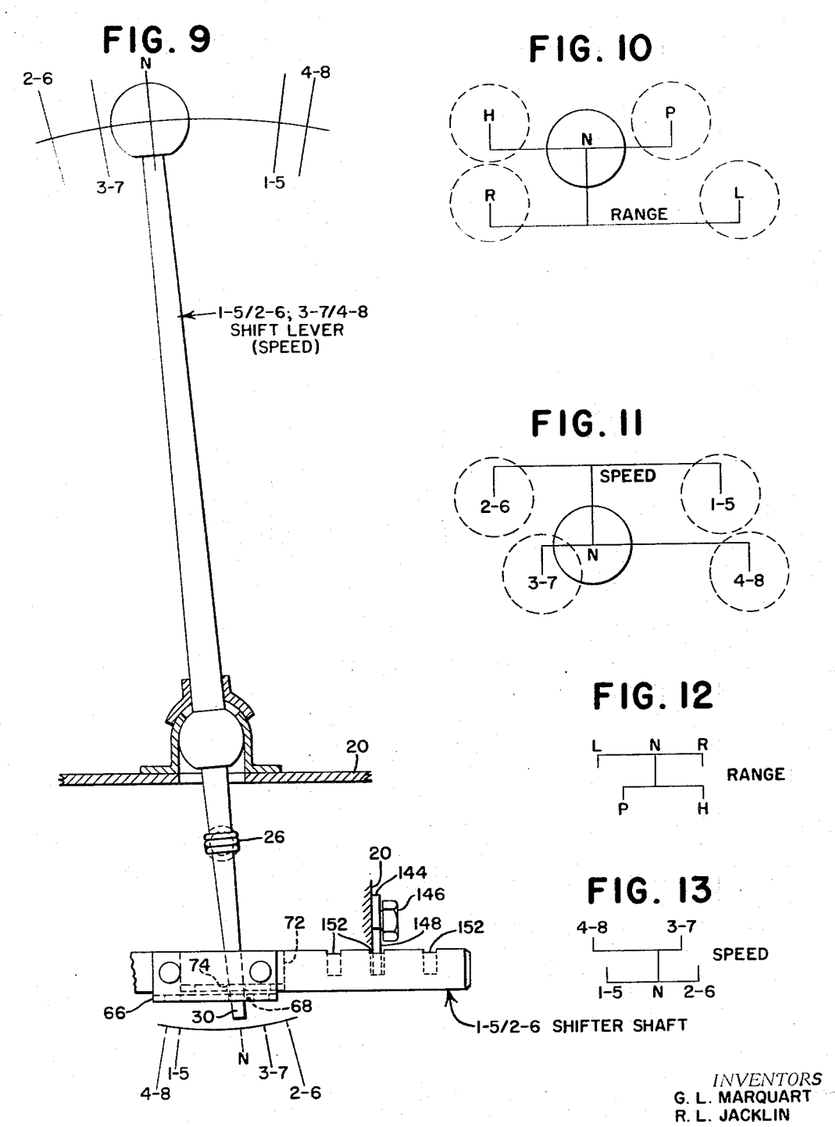
FIG. 9 is a view as seen substantially along the line 9—9 of FIG. 3.
FIG. 10 is a top view of the range shift pattern as seen by the operator.
FIG. 11 is a similar view of the speed shift pattern.
FIG. 12 is a view of the range pattern traced by the lower end of the range lever.
FIG. 13 is a view of the pattern traced by the lower end of the speed lever.

The entire transmission, much of which is not shown, is carried in a transmission housing or support, designated in its entirety by the numeral 20 irrespective of the fact that it is made up of several parts interconnected or otherwise related. The transmission contains gearing, not shown, of the dual-range multi-speed type, and selection among speeds and ranges is made by two shift levers or actuators, one of which is a range lever designated on the drawing as L-R, H-P shift lever (Range); the other is designated on the drawing as 1–5/2–6; 3–7/4–8 shift lever (Speed). The range lever is suitably carried by the support, as at 22, for universal movement so that its upper or knob end traces a modified H pattern as shown in FIG. 10. The speed lever is similarly universally mounted as at 24 and its upper end traces a modified H pattern as shown in FIG. 11. The lower end of the range lever will trace the pattern shown in FIG. 12; and the pattern in FIG. 13 is that traced by the lower end of the speed lever. The differences between FIGS. 10 and 12 and 11 and 13 are of course due to reversals of and lengths in moment arms. The lower ends of the levers are biased toward each other by means including a tension spring 26 having opposite ends connected respectively to the levers (FIG. 3).

The range lever controls range shift means, here comprising a pair of parallel elongated shifter shafts or elements carried by the support 20 for selective and individual movement back and forth along respective parallel shift paths. One of these shafts is the reverse-low shaft R-L, movable among neutral, reverse and low positions (R, N, L). The other element is the high-park shifter shaft and is movable among three positions, including a neutral position and high and park positions respectively at opposite sides of the neutral position. The lower end of the range lever is disposed laterally intermediate forward portions of the R-L and H-P shifter shafts and is designated at 28 in FIGS. 1 and 2.

Figure 1:
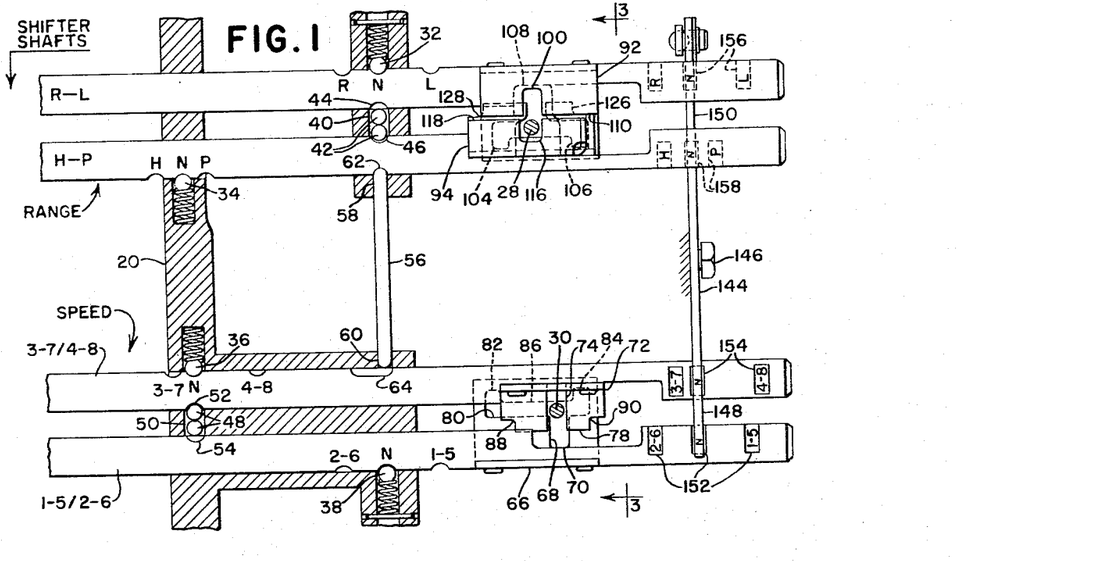
FIG. 1 is a plan, partly in section, and with portions rearranged relative to actual construction so as to facilitate the illustration, of the shifter shafts or elements of a dual-range multi-speed transmission, all elements appearing in their respective neutral positions.
Figure 2:
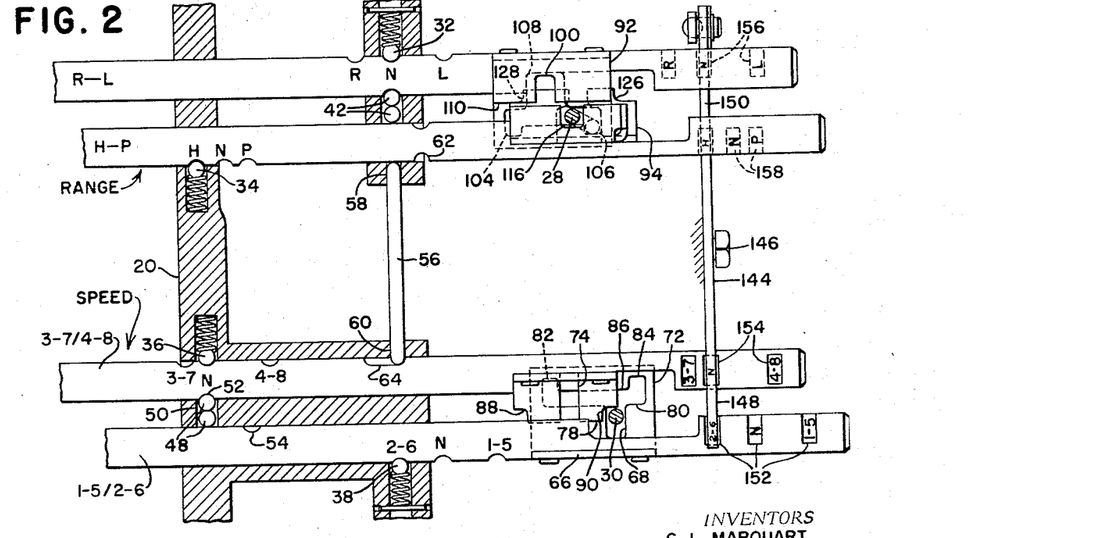
FIG. 2 is a similar view, showing two of the elements shifted, one in the range section and the other in the speed section of the transmission.
Figure 3:
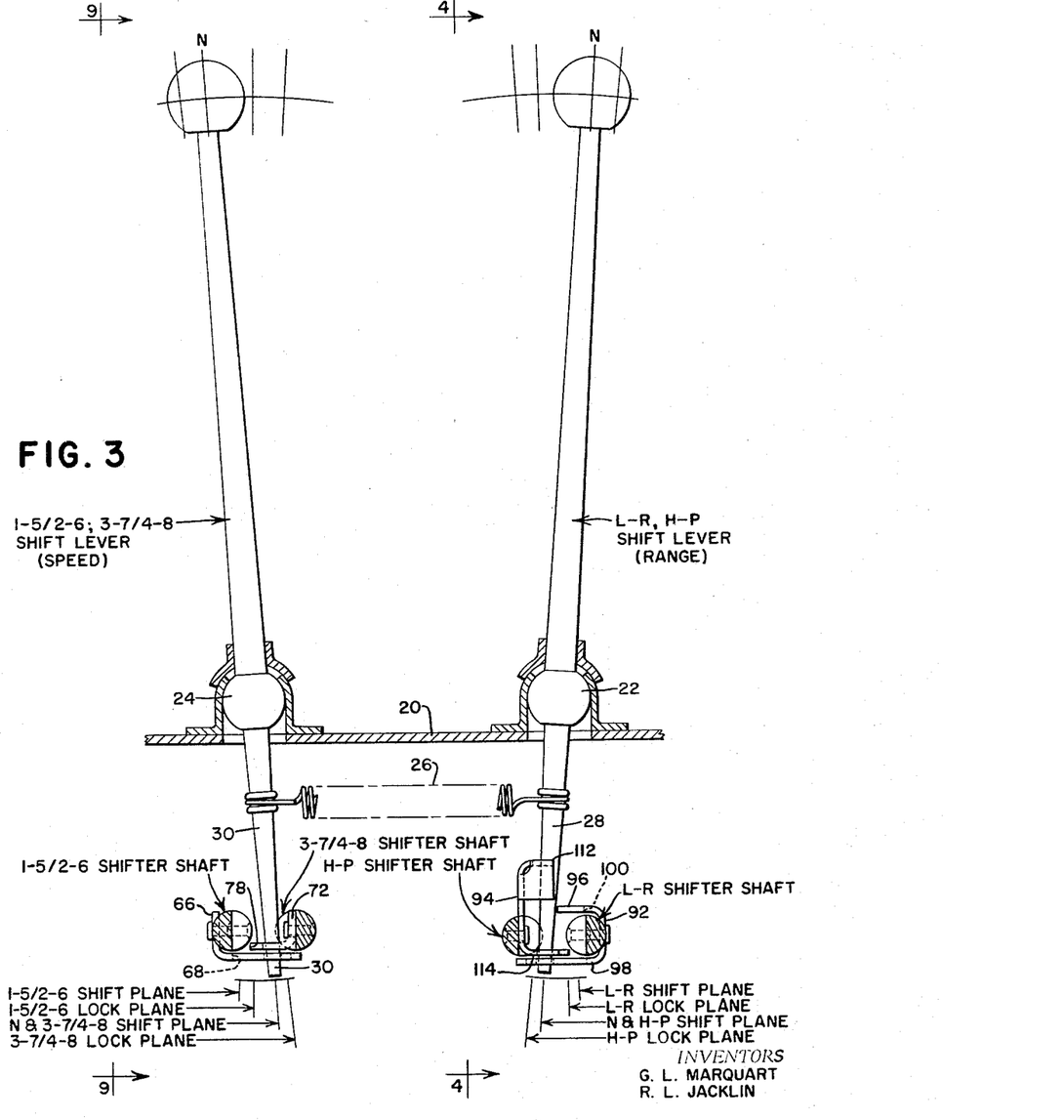
FIG. 3 is a view seen generally along the line 3—3 of FIG. 1.

The speed lever selectively shifts speed shifter shafts identified as the 3–7/4–8 shifter shaft and the 1–5/2–6 shifter shaft, the lower end of the lever being received between forward portions of these shifter shafts as shown at 30 in FIGS. 1 and 2.

It will be understood that the shifter shafts are connected separately to shiftable gearing, which may be of any type not material here.

The range or R-L shifter shaft is provided with three detent notches R, N and L, any one of which is adapted to receive a detent as shown at 32. A similar detent 34 is selectively engageable with any one of three notches H, N and P in the H-P shifter shaft. Likewise, detents are provided at 36 and 38, respectively, for the speed shifter shafts, the detent 36 being selectively engageable with the three notches 3–7, N and 4–8 and the detent 38 being selectively engageable with any one of the three notches 2–6, N and 1–5.

A portion of the support 20 is provided with a transverse bore 40 in which are carried two balls 42 for selective engagement, respectively, with notches 44 and 46 in the R-L and H-P shifter shafts. In the position of the parts shown in FIG. 1, either of the two last-mentioned shafts may be shifted relative to the other. When this occurs, the shifted shaft drives the balls transversely so that the remote ball engages the notch in the neutral shaft. This is an expedient preventing the shifting of both shafts out of neutral at the same time. A similar arrangement is provided by a pair of balls 48 received in a bore support 50 and cooperative with notches 52 and 54 respectively in the 3–7/4–8 and 2–6/1–5 shifter shafts.

Since the transmission is of the dual-range multi-speed type, both shift levers must be used to select a speed. For example, when the range shift lever shifts the R-L shifter shaft to its low or L position, the speed shifter lever may be used to shift either of the speed shifter shafts for selection of a speed position. In the present case, the four lowest speeds in the transmission are available; namely, first through fourth. In the example assumed, these will be forward speeds. If the R-L shifter shaft is shifted to its reverse or R position, the four speeds will be in reverse. If the range section of the transmission is operating in high range, by means of using the range shifter lever to shift the H-P shifter shaft to its high or H position, the four speeds selected via the speed shifter lever and the speed shifter shafts will be fourth through eighth.

A transmission of this character is usually designed as to speed ratios so that the eighth speed forward is relatively high, which affords convenience for transport and hard-road operation. However, in some areas, these speeds will be found to be higher than that permitted by local law. Accordingly, it is a feature of the invention to provide a transmission which, in those areas, may be equipped with what is known as an eighth-speed lockout. Stated broadly, this means is effective to prevent rearward shifting of the 3–7/4–8 shifter shaft when the H-P shifter shaft is in its high position; and, conversely, to prevent shifting of the H-P shifter shaft to its high position while the 3–7/4–8 shifter shaft is in its rearward or 4–8 position. This means leaves the other seven speeds forward available, as well as the four speeds in reverse. Specifically, the means illustrated here comprise a transverse rod or device 56 suitably supported in alined bores 58 and 60 in the support 20 and cooperative at opposite ends with notches 62 and 64 in the H-P and 3–7/4–8 shifter shafts, respectively. As seen in FIG. 1, the length of the rod 56 is such that it cannot be received in both notches 62 and 64 at the same time. If the H-P shifter shaft, for example, is shifted forwardly to its H or high position, it will drive the rod 56 into the notch 64. The notch 64 is elongated so that the 3–7/4–8 shifter shaft may be shifted forwardly, or to its 3–7 position, but it cannot be shifted rearwardly to its 4–8 position. Consequently, speeds one through seven are available but eighth speed is locked out.

Should the transmission be in neutral and the 3–7/4–8 shifter shaft shifted to its 4–8 position prior to making a range selection, the portion of the shifter shaft adjacent to the notch 64 will force the rod 56 to engage the notch 62 in the H-P shifter shaft. Therefore, the H-P shifter shaft cannot be shifted. Nevertheless, the R-L shifter shaft can be shifted, causing a selection of fourth speed in the transmission, along with others in the low range.

The mechanism is so designed that the lockout can be omitted in transmissions furnished for vehicles where the higher eighth speed is permissible.

Figures 4, 5, 6, 7, 8:
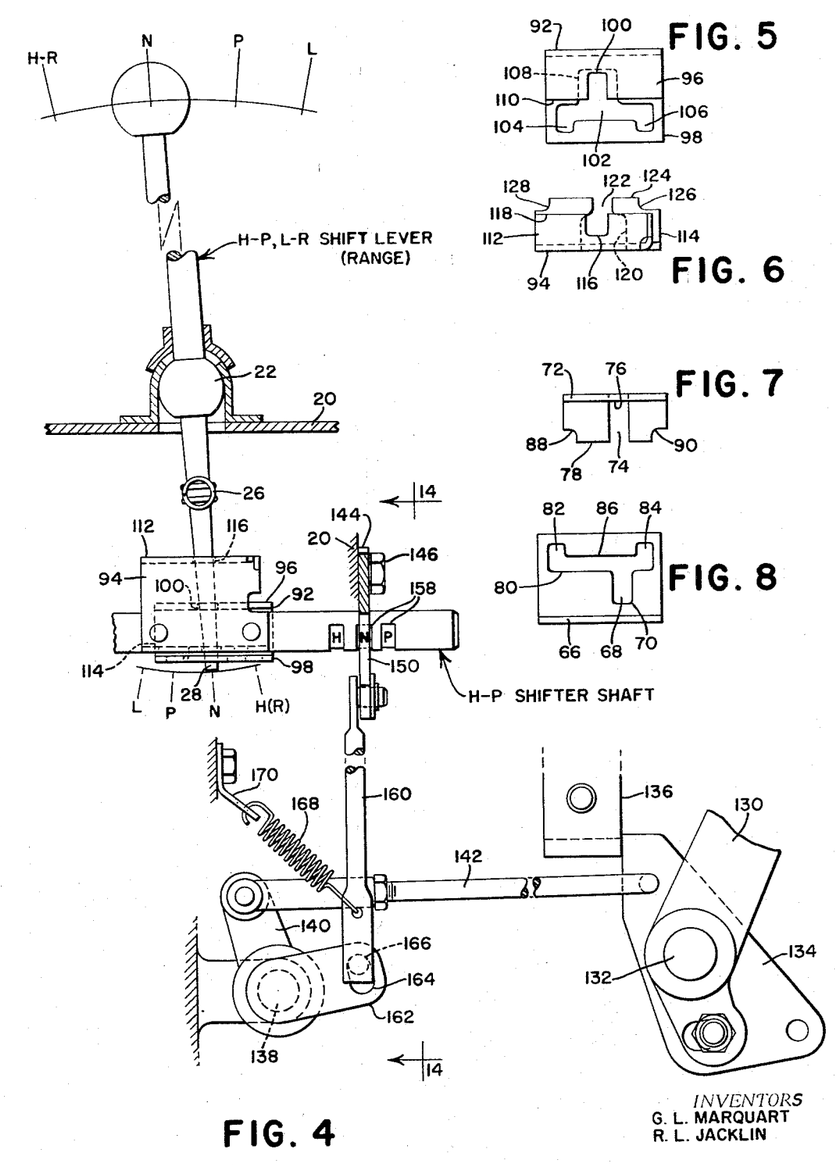
FIG. 4 is a view as seen substantially along the line 4—4 of FIG. 3.
FIG. 5 is a plan view of the reverse-low shifter guide.
FIG. 6 is a plan view of the high-park shifter guide.
FIG. 7 is a plan view of the 3–7/4–8 guide.
FIG. 8 is a plan view of the 1–5/2–6 guide.

The shift lever or actuator for the speed shifter shafts shifts these shafts selectively by means of guide and control connections between the lower end 30 of the shifter lever and, in this case, forward portions of the respective shifter shafts. The 1–5/2–6 shifter shaft has affixed thereto a guide in the form of a plate 66 in which is formed a lateral slot 68 (FIGS. 1, 2 and 8). When the speed selector shift lever is moved to the left in its cross-over phase of its H pattern (FIG. 11), the lower end of the lever moves oppositely or to the right (FIG. 13). This assures that the lower end 30 will be confined to the slot 68 adjacent to its right-hand or closed end 70 (FIG. 8). Consequently, as the speed selector lever is rocked back and forth in its shift phase or shift plane, the connection thereof to the 1–5/2–6 shifter shaft will cause that shaft to shift fore and aft, selecting the designated speeds.

A similar arrangement is provided for effecting connection between the speed selector lever and the 3–7/4–8 shifter shaft, the means here taking the form of a guide plate 72 which has a slot 74 opening to the right and having a closed end 76 at its left side (FIGS. 1, 2 and 7). When the speed selector lever is rocked laterally to the right (as seen at the top; FIG. 11), its lower end 30 will move to the left in the cross-over path and will escape from the open end of the slot 68 and will stop at the closed end 76 of the slot 74, whereupon the 3–7/4–8 shifter shaft may be moved fore and aft, selectively, according to fore and aft movement of the speed selector lever.

As best seen in FIG. 1, the slots 68 and 74 are laterally alined when both shifter shafts are in neutral. Thus, the speed selector lever may be selectively moved in the cross-over path so as to select complete engagement with either of the guides 66 or 72. The lateral portions of the guides are so constructed that there is considerable overlap (FIGS. 1, 2 and 3). Hence, for a major portion of the cross-over movement of the lower end 30 of the speed selector lever, it remains in engagement with both guides. Stated otherwise, the overlapped length of the slots 68 and 72 is such that substantial lateral movement of the lower end of the speed selector lever is required before the lower end escapes one slot completely to enter the other exclusively. As best seen in FIG. 7, the slot 74 opens to the right at a longitudinal marginal edge 78 of the guide 72; and, as seen in FIG. 1, this marginal edge terminates short of the shift plane or shift path for the 1–5/2–6 shifter shaft. See also FIG. 3. Therefore, when the lower end 30 of the speed selector shaft clears the slot 74, it is free to travel fore and aft in the 1–5/2–6 shift plane or path.

Similarly, the open end of the slot 68 in the guide 66 ends at a longitudinal marginal edge portion 80 (FIG. 8) and this edge terminates short of the shift plane or path for the 3–7/4–8 shifter shaft.

The purpose of the substantial lateral overlap of the portions of the guides 66 and 72 containing the slots 68 and 74, respectively, is to prevent either shifter shaft from overrunning its neutral position when returned thereto from a shifted position. Without provision such as made here, the tendency of a shifter shaft, when returning to neutral, is to coast past neutral, because of the inertia of the moving parts. For example, let it be assumed that the speed selector lever has shifted the 1–5/2–6 shifter shaft to its 2–6 position, the lower end 30 moving first from the central position of FIG. 1 to the closed end 70 of the slot 66 and then moved forwardly to shift the shifter shaft to its 2–6 position. At this time, the lower end 30 of the speed selector lever will be just to the right of the position shown in FIG. 2. Rocking of the upper end of the speed selector lever forwardly (so that the lower end 30 moves rearwardly), the lower end will approach alinement with the slot 74. The operator still has control of the momentum of the 1–5/2–6 shifter shaft and then rocks the speed selector lever laterally so that the lower end 30 travels across the alined slots so that selection of the 3–7/4–8 shifter shaft can be made. Without the overlap of the slots 68 and 74, the lower end 30 of the speed selector lever would lose contact with the guide 66 and the shifter shaft connected thereto could coast past the neutral position. However, since the slots overlap, the lower end 30 retains engagement with both slots for a substantial portion of the cross-over movement of the selector lever end portion 30. The 3–7/4–8 shifter shaft is locked against movement out of neutral because of the balls 48. Consequently, the effect of the overlapped slots and the lower end 30 of the speed selector lever is to lock the two shifter shafts momentarily together. The balls 48 assure that both shafts cannot move at once. Although the balls 48 may move to the right as soon as the notch 54 registers with them, this does not mean that the 1–5/2–6 shifter shaft can continue rearwardly, because as soon as it tends to do so, the notch 54 will cam the balls back to the notch 52. The time interval involved is so great that the 1–5/2–6 shifter shaft runs out of inertia by the time the lower end 30 of the speed selector shaft clears the marginal edge 80 and enters the closed end of the slot 74 for the guide 72.

The same thing is true in reverse order in returning the 3–7/4–8 shifter shaft from a shifted position to its neutral position, again the interlock means 48 cooperating with the overlapped slots 68 and 74 to prevent overrun.

It is another feature of the invention that means is provided for locking either of the shifter shafts in the speed section in its shifted position. For this purpose, each guide 66 and 72 is provided with a pair of retainer means. For the guide 66, this takes the form of a pair of notches 82 and 84 provided at opposite ends of a slot 86 which is bounded at one side by the marginal edge 80. The notch or retainer means 82 corresponds to the 4–8 position of the 3–7/4–8 shifter rod. The notch 84 corresponds to the 3–7 position. The marginal edge 78 of the other guide 72 is provided with similar notches 88 and 90. The notch 90 corresponds to the 2–6 position of 1–5/2–6 shifter shaft; and the notch 88 corresponds to the 1–5 position.

FIG. 2 shows a condition in which the 1–5/2–6 shifter shaft has been shifted forwardly to its 2–6 position. In accomplishing this position, the lower end 30 of the speed selector shaft has moved along the 1–5/2–6 shift plane. When the shift lever portion 30 reaches the forward limit of its shifting movement, which will be just to the right of the position shown in FIG. 2 (as seen by the tractor operator), it will register with the notch 9 in the guide 72. The lower end of the speed selector lever is biased to the left by the spring 66 and consequently as soon as the operator releases his grip on the knob or feels that the position just referred to has been achieved, the spring will move the lever portion 30 to the left and into engagement with the notch 90. As previously said, the opposite shifter shaft is locked in position by the balls 48. The result is that the two shifter shafts are locked together and consequently the shifted shifter shaft cannot jump out of shifted position. To return the shifted shaft to neutral, or to select another speed, the speed selector lever is rocked laterally to free the lower end 30 from the notch 90, returning the end portion 30 to the selected shifter path or plane.

Locking of the 1–5/2–6 shifter shaft in its 1–5 position occurs by cooperation of the speed selector lever portion 30 with the other notch 88 on the opposite guide 72. Similarly, the notches 82 and 84 in the guide 66 are capable of receiving the speed selector lever portion 30 when the 3–7/4–8 shifter shaft is shifted to either of its positions other than neutral, again the biasing means or spring 26 causing movement of the speed selector lever portion 30 to the left or toward the center of the tractor. Since the bias is in the same direction at all times, the notches are all similarly directed; that is to say, they all open toward the shift path or plane of the 1–5/2–6 shifter shaft.

The range selector lever lower portion 28 has a similar arrangement with each of the range shifter shafts R-L and H-P, the former having affixed thereto a guide 92, and a cooperative guide 94 being secured in lateral alinement to the H-P shifter shaft. These guides are best shown in FIGS. 1, 2, 3, 5, 6, 15 and 16.

FIG. 16 will be referred to first for a description of the guide 92. This guide is in the form of a U-shaped plate, havig upper and lower flanges 96 and 98. The upper flange has generally centrally thereof a lateral slot 100 for receiving the lower end 28 of the range selector lever when that lever operates in its R-L shift plane. The lower flange 98 has a generally T-shaped slot 102, having opposite end notches 104 and 106 and a generally central slot 108 substantially below the upper slot 100. The upper flange terminates at a longitudinal marginal edge 110 which lies along but is just to the left of the H-P shifter plane or path. When the range selector is rocked laterally so that its lower end 28 moves out of the notch 100, it clears the marginal edge 110 and then is free to run fore and aft in the slot 102 between the opposite end notches 104, the slot 102 lying in the shift plane for the H-P shifter shaft. The moment arm effecting shifting of the R-L shifter shaft is between the universal mounting 22 and the upper flange 96, the slot 108 in the lower flange 98 loosely accommodating the extreme lower end of the speed selector lever. This enables a selection in moment arms so that the fore and aft range of movement of the range lever may be made different from the other ranges; for example, the slot 100 could occur in the lower flange and the moment arm would be longer.

The other guide 94 is likewise of general U-shaped configuration, having an upper flange 112 and a lower flange 114. The upper flange has a central slot 116 which opens laterally to a fore and aft marginal edge 118. This marginal edge terminates close to but short of the shift path or plane for the R-L shifter shaft. The lower flange 114 has an enlarged central slot 120 which narrows and opens laterally at 122 to a longitudinal marginal edge portion 124, which likewise terminates short of the shift plane for the R-L shifter shaft. Retaining means is provided at opposite ends of the edge 124 in the form of notches 126 and 128.

When both the R-L and H-P shifter shafts are in neutral (FIG. 1) the slot means 100–108 of the guide 92 is alined with the slot means 116–120 of the guide 94. Therefore, the lower end 28 of the range selector lever is freely laterally rockable in its cross-over path to select one or the other of the shifter shafts. Being biased to the right side of the tractor because of the tension spring 26, the lower end portion 28 will occupy the position of FIG. 1; that is, toward the H-P shifter path or plane. In this location, the portion 28 is free of the slot 100 and is thus clear of the marginal edge 110. In other words, it is free to run back and forth in the slot 102 as it shifts the H-P shifter shaft via engagement with the notch 116. Here again, the arrangement is such that the moment arm between the mounting 22 and the shifter shaft is shortened because of engagement at 116 rather than at 120. The slot 120 is enlarged so as not to interfere with movement of the selector lever portion 28.

FIG. 2 shows a condition in which the H-P shifter shaft is shifted forwardly to its high position. Bias forces exerted by the spring 26 move the portion 28 into the forward notch 106 in the slot 102 of the guide 92, effecting a lockup between the two shifter shafts in the same manner as that described before in connection with the speed shifter shafts. The interlock balls 42 effect the same type of locking connection between the R-L and H-P shifter shafts. When it is desired to return the H-P shifter shaft to neutral, or to move it to its park position, the range selector lever is moved so that the lower end portion 28 becomes disengaged from the notch 106, returning it to the slot 102 which is coincident with the shift path for the H-P shifter shaft. If the operator desires to stop at neutral and then to cross over the shifting the R-L shifter shaft, the overlapped slot means operates to prevent overrun of the H-P shifter shaft. The converse is true of course when changing from the R-L shaft to the H-P shaft.

By way of explanation of the dotted portion of the range selector lever as it appears in FIG. 2, it should be observed that this portion will lie at an angle to the vertical, because of its extent downwardly, forwardly and inwardly from the universal mounting 22.

In the event that it is desired to use additional or alternate means for locking the shifter shafts in their respective positions, resort may be had to a locking mechanism controlled by movement of a second operator; that it, an operator in addition to the actuators represented by the range and speed selector lever. In the present case, the vehicle clutch pedal, a portion of which is shown at 130 in FIG. 4, is used as the operator. The clutch pedal may be mounted on a suitable cross shaft 132 to which is affixed an arm 134 capable of stopping against a support-carried stop 136 when the clutch is engaged. The clutch pedal is rocked forwardly and downwardly to a disengaged position, as is typical in vehicle installations.

A second cross shaft 138 is suitably carried by the support rearwardly of and parallel to the shaft 132 and has thereon an arm 140 which is connected by a link 142 to the clutch pedal arm 134.

A transversely elongated locking lever 144 is pivoted, as by a pivot cap screw 146, to the support on an axis parallel to and intermediate the two pairs of shifter shafts (FIGS. 1, 2 and 14). This lever has an upper arm 148 which traverses and overlies the speed shifter shafts, and a lower arm 150 which traverses and underlies the range shifter shafts. The 1–5/2–6 shifter shaft has therein three notches, denoted collectively by the numeral 152. These correspond respectively to the three positions of the shifter shaft; namely, 1–5, neutral and 2–6. These notches face upwardly and are receivable of an underportion of the upper arm 148 of the locking lever or blade 144. A similar plurality of notches is provided at 154 in the other speed shifter shaft. These are likewise receivable of an underportion of the locking lever arm 148.

Sets of notches are provided at 156 and 158 for the R-L and H-P shifter shafts respectively. These notches are received by the blade or lever arm 150 from below, since the notches open downwardly. The several notches are engaged by the lever or blade portions at any time when each of the shifter shafts is in any of its three positions. The blade is rockable to move its upper arm 148 upwardly and its lower arm 150 downwardly any time that the clutch pedal 130 is depressed. This is effected by a force transmitting connection including a link 160 between the left-hand end of the lever or blade and an arm 162 affixed to the cross shaft 138.

The arm 162 has therein a short arcuate slot 164 which receives a pin 166 at the lower end of the link 160. A biasing spring 168 is connected between the link 169 and a suitable connection 170 to the support 20 and acts upwardly to bias the lever or blade to its notch-engaging position, at the same time moving the pin 166 to the upper end of the slot 164. The pin and slot connection 164–166 provides a lost-motion device eliminating the application of positive rearward forces to the blade upon return of the clutch pedal to its clutch engaged position (FIG. 4). This is for the purpose of preventing the return of the clutch pedal from forcing the blade or lever into engagement with the shifter shafts in the event that the notches in the shifter shafts are not exactly alined. In other words, the biasing means 168 is independent of the biasing means normally effective to return the clutch pedal to clutch-engaged position. At the same time, the spring 168 acts upwardly through the link 160 to bias the blade or lever to notch-engaging position so that when the shifter shaft whose notch is temporarily misalined is moved enough to aline that notch, the blade will move into locking position.

The shifter guides, shown particularly in FIGS. 5–8 and FIGS. 15 and 16 may be utilized without the retainer means or notches (e.g., 82 and 84 in the guide 66) while still retaining the benefits of the overlapped slots as means for preventing coasting of the shifter shafts past their respective neutral positions. If the interlock notches are eliminated, reliance may be placed on the lever-engageable notches in the shifter shafts themselves.

It will be seen from the foregoing that the several objects and features, outlined before, have been achieved by a simple, trouble-free construction. Features and advantages other than those enumerated will readily occur to those versed in the art, as will many modifications and alterations in the preferred embodiment disclosed, all without departure from the spirit and scope of the invention.

What is claimed is:

1. Shifter mechanism for a change-speed transmission, comprising: a support; a pair of support-carried shifter elements respectively selectably shiftable to and from shifted positions at opposite sides of neutral positions along parallel shift paths; interlock means operative to lock either neutrally-positioned element to the support upon shifting of the other element out of its neutral position; a pair of laterally overlapped guide means fixed respectively to the elements and each extending from one shift path toward and having a marginal edge portion short of and closely paralleling the other path, said two guide means respectively having slot means therein normal to said paths and in substantial register with each other to establish a neutral cross-over path between the shift paths, each slot means having an open end at the marginal edge portion of its guide means and a closed end beyond the opposite marginal edge portion and disposed in the adjacent shift path; and a shift actuator universally movably carried by the support and neutrally received in and confined by both slot means for cross-over movement from one shift path to the other, the open end of each slot means enabling escape of the actuator into the closed end of the other slot means and said closed end and the associated adjacent marginal edge portion being operative to guide the actuator along the respective shift path among the associated neutral and shifted positions.

2. The invention defined in claim 1, including: a pair of retainer means on and spaced along each guide means at opposite sides of the associated slot means in correspondence respectively with the shifted positions of the opposite element so that shifting of either element to a shifted position causes lateral alinement of the actuator with a corresponding retainer means on the neutrally-positioned element; and said actuator being movable laterally into releasable engagement with the alined retainer means for holding the shifted element in its selected shifted position.

3. The invention defined in claim 1, including: means biasing the actuator toward one shift path; and a pair of retainer means on and spaced along each guide means at opposite sides of the associated slot means in correspondence respectively with the shifted positions of the opposite element so that shifting of either element to a shifted position causes lateral engagement of the biased actuator with a corresponding retainer means on the neutrally-positioned element for holding the shifted element in its selected shifted position.

4. The invention defined in claim 3, in which: each retainer means is a notch adjacent to an associated edge portion and opening laterally in the direction opposite to that in which the actuator is biased.

5. Shifter mechanism for a change-speed transmission, comprising: a support; a pair of support-carried shifter elements respectively selectively shiftable to and from shifted positions at opposite sides of neutral positions along parallel shift paths; a pair of laterally overlapped guide means fixed respectively to the elements and each extending from one shift path toward but terminating in a marginal edge portion short of and closely paralleling the other path, said two guide means respectively having slot means therein normal to said paths and in substantial register with each other to establish a neutral crossover path between the shift paths, each slot means having an open end at the marginal edge portion of its guide means and a closed end beyond the opposite marginal edge portion and disposed in the adjacent shift path; and a shift actuator universally movably carried by the support and neutrally received in and confined by both slot means for cross-over movement from one shift path to the other, the open end of each slot means enabling escape of the actuator into the closed end of the other slot means and said closed end and the associated adjacent marginal edge portion being operative to guide the actuator along the respective shift path among the associated neutral and shifted positions.

6. Shifter mechanism for a change-speed transmission, comprising: a support; a pair of support-carried shifter elements respectively selectively shiftable to and from shifted positions at opposite sides of neutral positions along parallel shift paths; interlock means operative to lock either neutrally-positioned element to the support upon shifting of the other element out of its neutral position; a shift actuator universally movably carried by the support and extending between the elements for selective lateral shifting engagement with either element to shift the engaged element among its neutral and shifted positions; a pair of retainer means on and spaced along each element in correspondence respectively with the shifted positions of the opposite element so that shifting of either element to a shifted position causes lateral alinement of the actuator with a corresponding retainer means on the neutrally-positioned element; and said actuator being movable further laterally into releasable engagement with the alined retainer element, while retaining shifting engagement with the shifted element, for releasably locking the shifted element to the neutrally positioned element.

7. The invention defined in claim 6, including: means biasing the actuator toward one shift path into engagement with the associated retainer means.

8. The invention defined in claim 6, including: a second pair of shifter element carried by the support in parallelism with and alongside the first-mentioned pair and having retainer means similar to those of said first-mentioned pair; a second actuator alongside the first-mentioned actuator and similarly related to the second pair of elements; and means interconnecting the actuators and biasing same respectively in opposite directions to achieve locking of the respective shifted element to its associated neutrally positioned element.

9. Shifter mechanism for a change-speed transmission, comprising: a support; a pair of parallel, horizontal shifter elements carried by the support for individual movement along parallel shift paths, each element having a plurality of notches spaced apart therealong and the notches on one element facing upwardly and those on the other element facing downwardly; a lock lever pivoted to the support on an axis parallel to and intermediate the elements and having an upper transverse arm selectively receivable in the upwardly facing notches and a transversely opposite lower arm selectively receivable in the downwardly facing notches, said lever being rockable in one direction to engage one arm with one notch in one element and the other arm with one notch in the other element and rockable in the opposite direction to disengage the arms from the notches; and means movably carried by the support for rocking the lever.

10. The invention defined in claim 9, in which: the last-named means includes an operator movable between first and second positions and biased for return to its first position, a one-way force-transmitting connection between the lever and the operator for moving the lever in its notch-disengaging direction upon movement of the operator to its second position and biasing means independent of the operator and acting to move the lever in its notch-engaging direction.

11. Shifter mechanism for a change-speed transmission, comprising: a support; first and second pairs of parallel, horizontal shifter elements carried by the support for individual movement along parallel shift paths, each element having a plurality of notches spaced apart therealong and the notches on the elements of one pair facing upwardly and those on the elements of the other pair facing downwardly; a lock lever pivoted to the support on an axis parallel to and intermediate the pairs of elements and having an upper transverse arm selectively receivable in the upwardly facing notches and a transversely opposite lower arm selectively receivable in the downwardly facing notches, said lever being rockable in one direction to engage one arm with one notch in each element of one pair of elements and the other arm with one notch in each element of the other pair of elements and rockable in the opposite direction to disengage the arms from the notches; and means movably carried by the suppport for rocking the lever.

12. Shifter mechanism for a change-speed transmission, comprising: a support; a pair of speed-shifter elements carried by the support for selective movement back and forth along parallel shift paths, each element having a pair of shifted positions at opposite sides of a neutral position; range-shift means including a member carried by the support for shifting along a shift path parallel to the paths of the elements and back and forth between first and second positions; and lock-out means operative among the support, the range-shift means and one of the shift elements for preventing movement of the one element to one of its shifted positions while the range-shift means is in its first position and for preventing movement of the range-shift means to its first position while said one element is in its said one position, said lock-out means including transversely facing cooperative notches in said member and said one element and a lock device carried by the support for movement transversely of the shift paths and cooperative with the notches to engage the member notch when said one element is shifted to said one position and to engage the notch in said one element when the member is shifted to said first position.

13. The invention defined in claim 12, in which: the notch in the one element is elongated in the direction of the other shifted position of said one element to enable said one element to be shifted to said other shifted position while the member is in its first position.

References Cited by the Examiner

UNITED STATES PATENTS

| | | | |
|---|---|---|---|
| 1,098,143 | 5/1914 | Winton et al. | 74—477 X |
| 1,726,132 | 8/1929 | Williams | 74—477 |
| 1,780,270 | 11/1930 | Moorhouse | 74—477 |
| 2,667,082 | 1/1954 | Brock et al. | 74—477 |

MILTON KAUFMAN, *Primary Examiner.*